United States Patent
Yang et al.

(10) Patent No.: US 10,235,341 B2
(45) Date of Patent: Mar. 19, 2019

(54) METHOD FOR SOLVING THE DECOMPOSITION-COORDINATION CALCULATION BASED ON BLOCK BORDERED DIAGONAL FORM (BBDF) MODEL USING DATA CENTER

(71) Applicant: Tianjin University, Tianjin (CN)

(72) Inventors: Ting Yang, Tianjin (CN); Wenping Xiang, Tianjin (CN); Yingmin Feng, Tianjin (CN); Haibo Pen, Tianjin (CN); Mingyu Xu, Tianjin (CN); Jinkuo You, Tianjin (CN); Hongtao Wang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 14/901,726

(22) PCT Filed: Sep. 22, 2014

(86) PCT No.: PCT/CN2014/087114
§ 371 (c)(1),
(2) Date: Dec. 29, 2015

(87) PCT Pub. No.: WO2015/188504
PCT Pub. Date: Dec. 17, 2015

(65) Prior Publication Data
US 2017/0083478 A1    Mar. 23, 2017

(30) Foreign Application Priority Data
Jun. 12, 2014 (CN) .......................... 2014 1 0260630

(51) Int. Cl.
*G06F 17/11*    (2006.01)
*G06F 11/36*    (2006.01)
(Continued)

(52) U.S. Cl.
CPC .......... *G06F 17/11* (2013.01); *G06F 9/45558* (2013.01); *G06F 11/36* (2013.01);
(Continued)

(58) Field of Classification Search
CPC ...... G06F 17/11; G06F 9/45558; G06F 11/36; G06F 17/16
(Continued)

(56) References Cited

U.S. PATENT DOCUMENTS

2008/0049013 A1    2/2008 Nasle
2012/0191439 A1    7/2012 Meagher

FOREIGN PATENT DOCUMENTS

CN    101169743 A    4/2008
CN    102567076 A    7/2012
(Continued)

OTHER PUBLICATIONS

Weixing Zhao, et al., Reactive power optimization decomposition algorithm based on BBDF model, <Science Technology and Engineering>, Sep. 2008, p. 5170-5177, vol. 8, No. 18.
(Continued)

*Primary Examiner* — Tan V Mai
(74) *Attorney, Agent, or Firm* — George G. Wang; Bei & Ocean

(57) ABSTRACT

Method for solving the decomposition-coordination calculation based on Block Bordered Diagonal Form (BBDF) model by using data center. During the solving process, partitioning the electric power system network by using the existing network partitioning method to achieve the grid partition, and setting the parameters of virtual memories firstly, thus to establish the bin-packing model with the priority of energy efficiency; and then, setting each calculating step of the decomposition-coordination calculation based on BBDF as a task. Through the manners that servers
(Continued)

host VMs and VMs map tasks, the decomposition-coordination algorithm can be executed in data center, and the running time and energy consumption of data center can be calculated. The calculating time of decomposition-coordination algorithm is shortened and the energy consumption in data center. Moreover, with the increase of scale and the complexity of the electric power system, the advantages of the method using data center presented by the present invention are becoming much more obvious.

3 Claims, 3 Drawing Sheets

(51) Int. Cl.
*G06F 9/455* (2018.01)
*G06F 17/16* (2006.01)
(52) U.S. Cl.
CPC .... *G06F 17/16* (2013.01); *G06F 2009/45583* (2013.01); *G06F 2009/45595* (2013.01)
(58) Field of Classification Search
USPC .......................................................... 708/446
See application file for complete search history.

(56) References Cited

FOREIGN PATENT DOCUMENTS

| CN | 102662750 A | 9/2012 |
|---|---|---|
| CN | 103294521 A | 9/2013 |
| CN | 103296680 A | 9/2013 |
| CN | 103617455 A | 3/2014 |
| CN | 104035868 A | 9/2014 |

OTHER PUBLICATIONS

Wenkai Zhao, et al., Nested BBDF partitioning algorithm in power system parallel computation, <Proceedings of the CSEE>, Sep. 5, 2010, p. 66-73, vol. 30, No. 25.

Mingwei Xu, et al., Greening data center networks with throughput-guranteed power-aware routing, <Computer Networks>, Oct. 30, 2013, vol. 57, No. 15.

Xiaoqiao Meng et al., Improving the scalability of data center networks with traffic-aware virtual machine placement, <IEEE Infocon 2010 proceedings>, Mar. 19, 2010.

METHOD FOR SOLVING THE DECOMPOSITION-COORDINATION CALCULATION BASED ON BLOCK BORDERED DIAGONAL FORM (BBDF) MODEL USING DATA CENTER

TECHNICAL FIELD

The present invention relates to a decomposition-coordination calculation based on Block Bordered Diagonal Form (BBDF) model by using data center, especially to a method for solving BBDF in electrical power system using Data Center.

BACKGROUND ART

With the development of large-scale regional interconnected power grids, calculations such as power flow calculation, node voltage calculation, transient calculation and reactive optimization calculation in electric power system put forward a higher requirement for calculating speed. When computing scale reaches a certain degree, the calculating time becomes so long that it's hard to get the optimal result with existing computing methods. The Block Bordered Diagonal Form (BBDF) model is widely applied in many aspects of electric power system computing. Among the methods for solving BBDF model, the most common method is decomposition-coordination parallel algorithm. Currently, running in the single computer or multi-computer with rough scheduling methods is adopted commonly, which cause disadvantages such as long calculating time and poor efficiency.

The cloud computing data center is a new kind of internet computing pattern. As the technique of virtualization was presented, Virtual Machines (VMs) migration and consolidation technologies provide feasible methods for solving complex electric power system computing. In data center, great number of Physical Machines (PMs), i.e. computing servers, provide huge computing capability. For complex electric power system computing problem, it can be decomposed into many distributed small tasks, and then each of tasks map to VMs and is placed in PMs. By using this kind of calculating method, the complex calculating time will be greatly reduced.

Considering the process of parallel computing in data center, energy consumption is as important as computational acceleration. With the wide application of cloud computing and big data, energy consumption of data center becomes tremendously large. In 2001, the worldwide energy consumption of data center had reached 6358 hundred million kilowatt-hour (568 hundred million kilowatt-hour in China); and in 2012, the energy consumption increased to 7202 hundred million kilowatt-hour (664 hundred million kilowatt-hour in China). Therefore, only special calculation model and mapping methods with energy efficiency can be accepted and widely applied in data center. The present invention proposes an energy-efficient method to map BBDF model and decomposition-coordination parallel calculation into cloud computing data center.

SUMMARY OF THE INVENTION

The present invention is intended to provide a method for solving BBDF in electrical power system by using data center, which establishes a bin-packing model with the priority of energy efficiency while solving. Because of the high performance of data center, the computing time is also shortened.

The technical solution of the present invention is as follows:

A method for solving the decomposition-coordination calculation based on BBDF by using data center, which comprises the following steps:

(1) partitioning the electric power system network by using the existing network partitioning method to achieve the grid partition;

(2) setting each calculating step of the decomposition-coordination calculation based on BBDF as a task, and counting the total number of tasks of calculating process;

(3) acquiring the values of MIPS (Million Instructions Per Second) and memory in each PMs of data center, setting the number of VMs, and setting the values of MIPS and memory of each VM;

(4) calculating the total energy consumption $E_{total}$ of IT equipments in data center by the following formula:

$$E_{total} = \sum_{i=1}^{N} E_{server} + \sum_{j=1}^{T} E_{switch} \qquad (1)$$

wherein, $E_{server}$ represents the energy consumption of single server in the data center, $E_{switch}$ represents the energy consumption of single switch in the data center, N represents the number of servers in the data center, T represents the number of switches in the data center.

The energy consumption model of single server is expressed as follows:

$$E_{server} = P_{baseline} t_{max} + P_{VM} \sum_{k=1}^{M} t_k \qquad (2)$$

wherein, $P_{baseline}$ represents the power consumption of the no-load running server, $t_{max}$ represents the whole running time of servers, $P_{VM}$ represents the power consumption of a virtual machines in servers, $t_k$ represents the running time of the virtual machine k in servers, M represents the amount of virtual machines in servers;

The energy consumption model of single switch is expressed as follows:

$$E_{switch} = P_{switch} t_{max} \qquad (3)$$

wherein, $P_{switch}$ represents the running power consumption of switches, $t_{max}$ represents the whole running time of switches;

(5) using bin-packing model to describe the server energy consumption model, and achieving the minimum energy consumption model of servers;

the set of virtual machines is: $V = \{V_1, V_2, \ldots, V_Q | V_j = (R_j^{MIPS}, R_j^{MEM})\}$, wherein $R_j^{MIPS}$ and $R_j^{MEM}$ represent the values of MIPS and memory respectively for one virtual machine, the capacity value of single server is $C_i = (C_i^{MIPS}, C_i^{MEM})$, wherein $C_i^{MIPS}$ and $C_i^{MEM}$ represent the values of MIPS and memory respectively in a single server. The total servers' energy consumption model of the data center is expressed as follows:

$$\min \sum_{i=1}^{} E_{server} H_i \qquad (4)$$

The constraints of the total servers' energy consumption model are as follows:

$$\sum_{j=1}^{M} R_j^{MIPS} \square X_{j,i} \leq C_i^{MIPS}, \forall i \in \{1, 2, 3 \dots \} \quad (5)$$

$$\sum_{j=1}^{M} R_j^{MEM} \square X_{j,i} \leq C_i^{MEM}, \forall i \in \{1, 2, 3 \dots \} \quad (6)$$

$$X_{j,i}=0 \text{ or } 1 \quad (7)$$

$$H_i=0 \text{ or } 1 \quad (8)$$

wherein, $X_{j,i}=1$ represents the virtual machine j is packed in the server i, $X_{j,i}=0$ represents the virtual machine j is not in the server i; if the server i is used, $H_i=1$, otherwise, $H_i=0$;
(6) adopting best-fit algorithm or descending order best-fit algorithm to calculate the total energy consumption of data center servers;
(7) packing the VM mentioned in step 3 into the servers;
(8) packing every task mentioned in step 2 into the corresponding VM which locates in a data center server.

The packing process of step 7 is based on the constraints of total servers' energy consumption model of the data center servers mentioned in step 5.

Adopting indiscriminate order placement method or the following binding method to pack every task mentioned in step 2 into the corresponding virtual memory which locates in a data center server mentioned in step 8:
(1) According to the grid partition of BBDF model and the command length of task, bind the tasks which represent every step of calculation after calculating the variable of coordination ($X_t$, the output of task 13 in FIG. 3). With this method, the parallel calculating among different modules can be realized and the computing time can be shortened.
(2) For tasks before the variable of coordination ($X_t$), place the tasks with input-output relationships in adjacent VMs, then the amount of the communication data and communication expense by using data center networks can be reduced.

The method for solving the decomposition-coordination calculation by using Data Center of present invention can be widely used in the process of solving the BBDF model of electrical power system. Compared with the traditional calculating pattern of multi-thread computing in single machine or simple scheduling method in multi-machines, the present invention shortens the calculating time of decomposition-coordination calculation and reduces the energy consumption of data center. With the increase of size and the complexity of the electric power system, the advantages of the method using data center presented by this invention are becoming much more obvious.

DETAILED DESCRIPTION OF THE INVENTION

Figure 1:
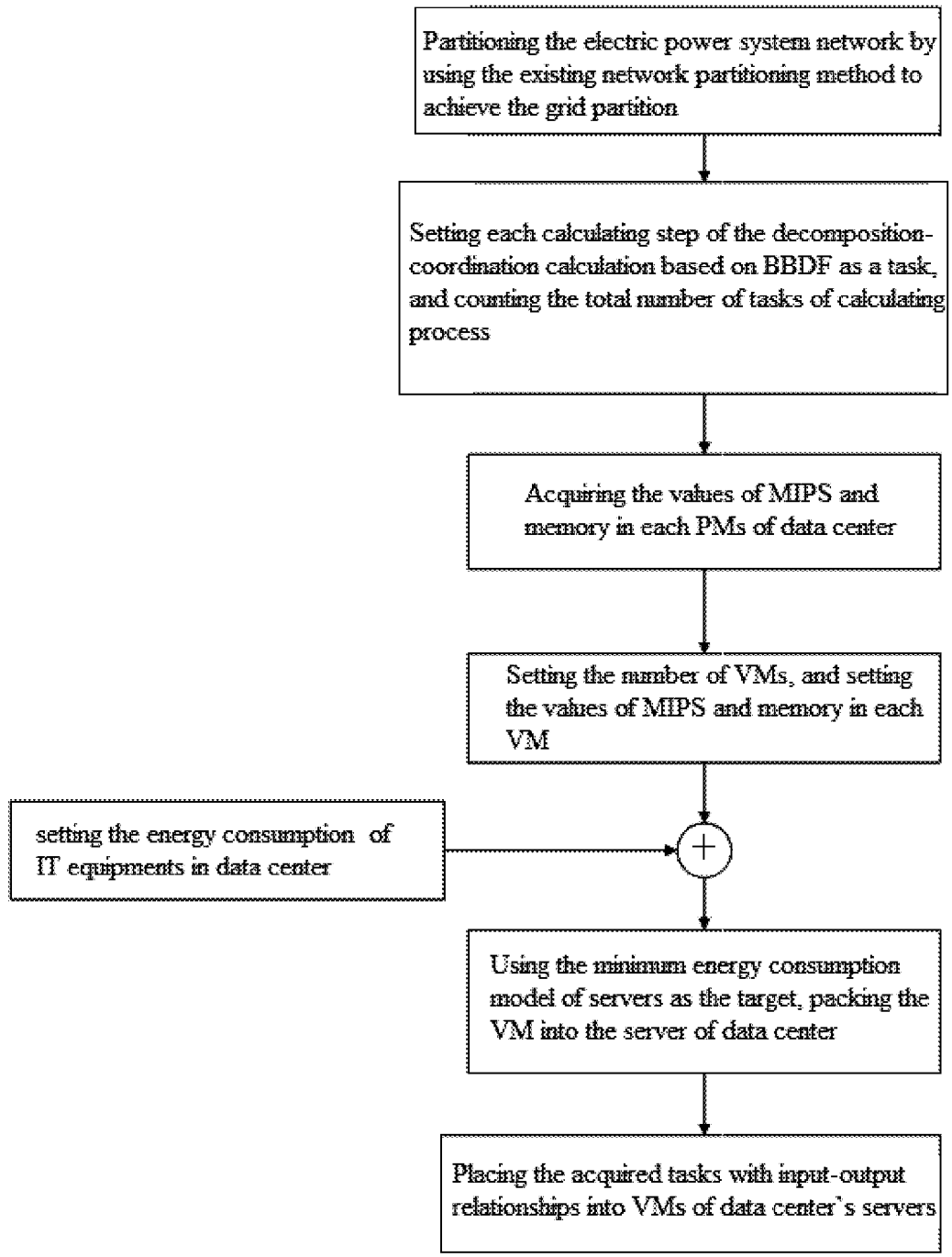
FIG. 1 shows a detail flow diagram of using the method for solving the decomposition-coordination calculation based on Block Bordered Diagonal Form (BBDF) model.

The present invention will be further described in detail combining with specific embodiments.

The method for running the decomposition-coordination calculation in data center for solving the BBDF model of electric power system of present invention comprises the following steps:
1. partitioning the electric power system network by using the existing network partitioning method to achieve the grid partition;
   The approaches such as nodal decomposition, branch cutting and unify network partitioning can be used in the electric power system partitioning.
2. Setting each calculating step of the decomposition-coordination calculation as a task, and calculating the number of tasks of whole calculating process;
3. acquiring the values of MIPS and memory in each PMs of data center, setting the number of VMs, and setting the values of MIPS and memory in each VM; for instance: when calculating IEEE 118 nodes standard electric power system, setting the MIPS of server as 2580 and memory as 512 MB, the VMs' MIPS is set ranges between 700 and 900 randomly, and VMs' memory for 128 MB;
4. Calculating the total energy consumption $E_{total}$ of IT equipments in data center by the following formula:

$$E_{total} = \sum_{i=1}^{N} E_{server} + \sum_{j=1}^{T} E_{switch} \quad (1)$$

wherein, $E_{serer}$ represents the energy consumption of single server in the data center, $E_{switch}$ represents the energy consumption of single switch in the data center, N represents the number of servers in the data center, T represents the number of switches in the data center.

The energy consumption model of single server is expressed as follows:

$$E_{server} = P_{baseline} t_{max} + P_{VM} \sum_{k=1}^{M} t_k \quad (2)$$

wherein, $P_{baseline}$ represents the power consumption of the no-load running server, $t_{max}$ represents the whole running time of servers, $P_{VM}$ represents the power consumption of a virtual machines in servers, $t_k$ represents the running time of the virtual machine k in servers, M represents the amount of virtual machines in servers;

The energy consumption model of single switch is expressed as follows:

$$E_{switch}=P_{switch} t_{max} \quad (3)$$

wherein, $P_{switch}$ represents the running power consumption of switches, $t_{max}$ represents the whole running time of the switch;
5. Due to 80% IT equipments' energy in data center is consumed by computing servers, i.e. PMs, the energy consumption of servers are calculated firstly, according to Analytic Hierarchy Process (AHP), and then calculating the energy consumption of switches, finally the total energy consumption of data center can be calculated by adding the energy consumption of servers and switches. Therefore, the energy consumption of servers should be minimized firstly, which employs the bin-packing model to optimize the problem. The detailed description is presented as following:

The set of VMs is: $V=\{V_1, V_2, \ldots, V_Q | V_j = (R_j^{MIPS}, R_j^{MEM})\}$, wherein $R_j^{MIPS}$ and $R_j^{MEM}$ represent the values of MIPS and memory respectively for one virtual machine, the capacity of single server is $C_i = (C_i^{MIPS}, C_i^{MEM})$, wherein $C_i^{MIPS}$ and $C_i^{MEM}$ represent the values of MIPS and memory respectively in single server. The total servers' energy consumption model of the data center is expressed as follows:

$$\min \sum_{i=1} E_{server} H_i \quad (4)$$

The constraints of the total servers' energy consumption model are listed as follows:

$$\sum_{j=1}^{M} R_j^{MIPS} \Box X_{j,i} \leq C_i^{MIPS}, \forall i \in \{1, 2, 3 \ldots\} \quad (5)$$

$$\sum_{j=1}^{M} R_j^{MEM} \Box X_{j,i} \leq C_i^{MEM}, \forall i \in \{1, 2, 3 \ldots\} \quad (6)$$

$$X_{j,i} = 0 \text{ or } 1 \quad (7)$$

$$H_i = 0 \text{ or } 1 \quad (8)$$

wherein, $X_{j,i}=1$ represents the virtual machine j is packed in the server i, $X_{j,i}=0$ represents the virtual machine j is not in the server i; if the server i is used, $H_i=1$, otherwise, $H_i=0$;

6. adopting best-fit algorithm or descending order best-fit algorithm to calculate the total energy consumption of data center servers; wherein, the description of best-fit algorithm and descending order best-fit algorithm is as follows:

Best-fit algorithm: it can be described as a manner to put items into boxes in order. Firstly, put the first item into the first box, then consider the factor that whether the first box has enough room to placenext item. If the room is enough, put the second item into the first item, otherwise a new box would be ready to place it. The process would go on in turns by the similar manner. When putting the item i into the box, the possible box should have enough room to hold it, and have the minimum room after placing item i. If all boxes couldn't meet the requirements, a new box would use.

Descending order best-fit algorithm: Before packing, the items should be ranked following the items' size in descending order. After sorting, the first item will put into the first box, and then consider the factor that whether the first box has enough room to hold next item. If the room is enough, put the second item into the first item, otherwise a new box would be ready to hold it. The process would go on in turns by the similar manner. When putting the item i into the box, the possible box should have enough room to hold it, and have the minimum room after placing item i. If all boxes couldn't meet the requirements, a new box would use.

Figure 2:
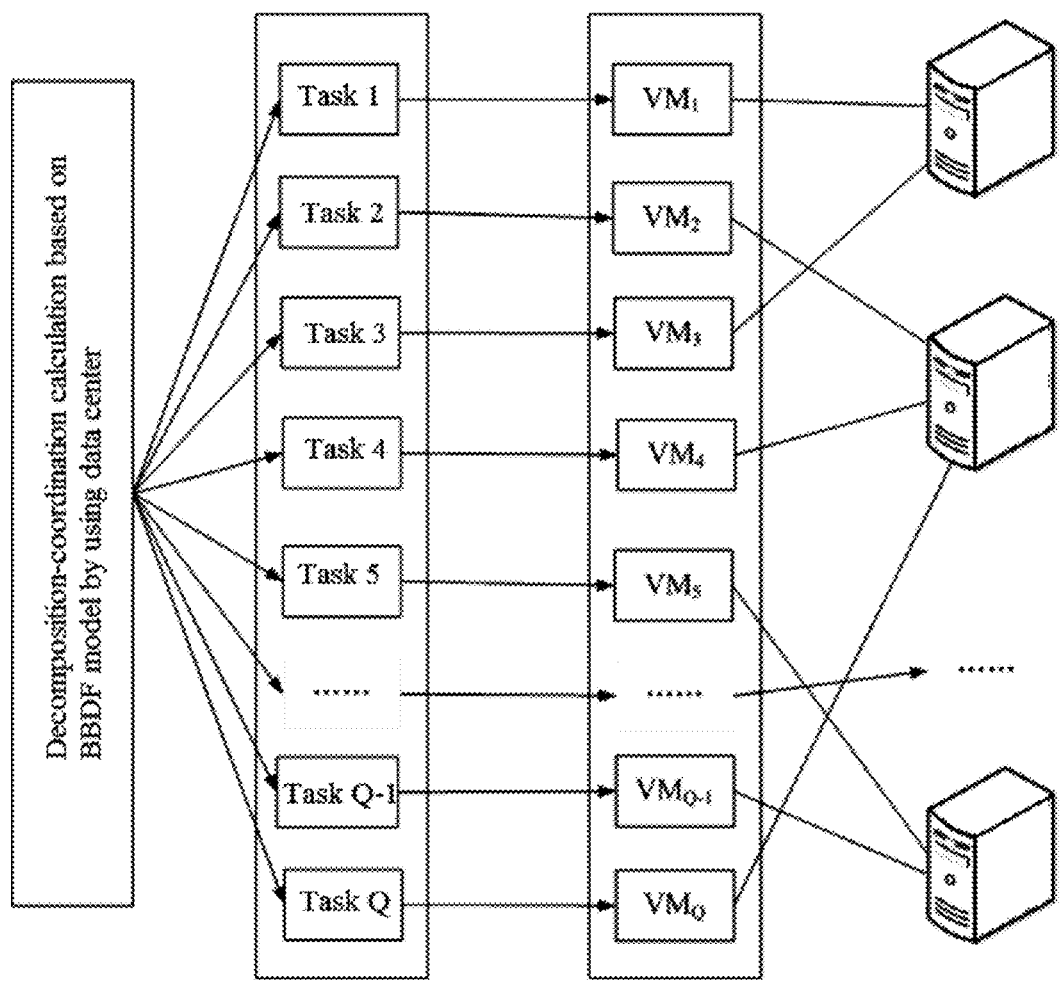
FIG. 2 shows a mapping process among distributed tasks, VMs and PMs in data center.
Figure 3:
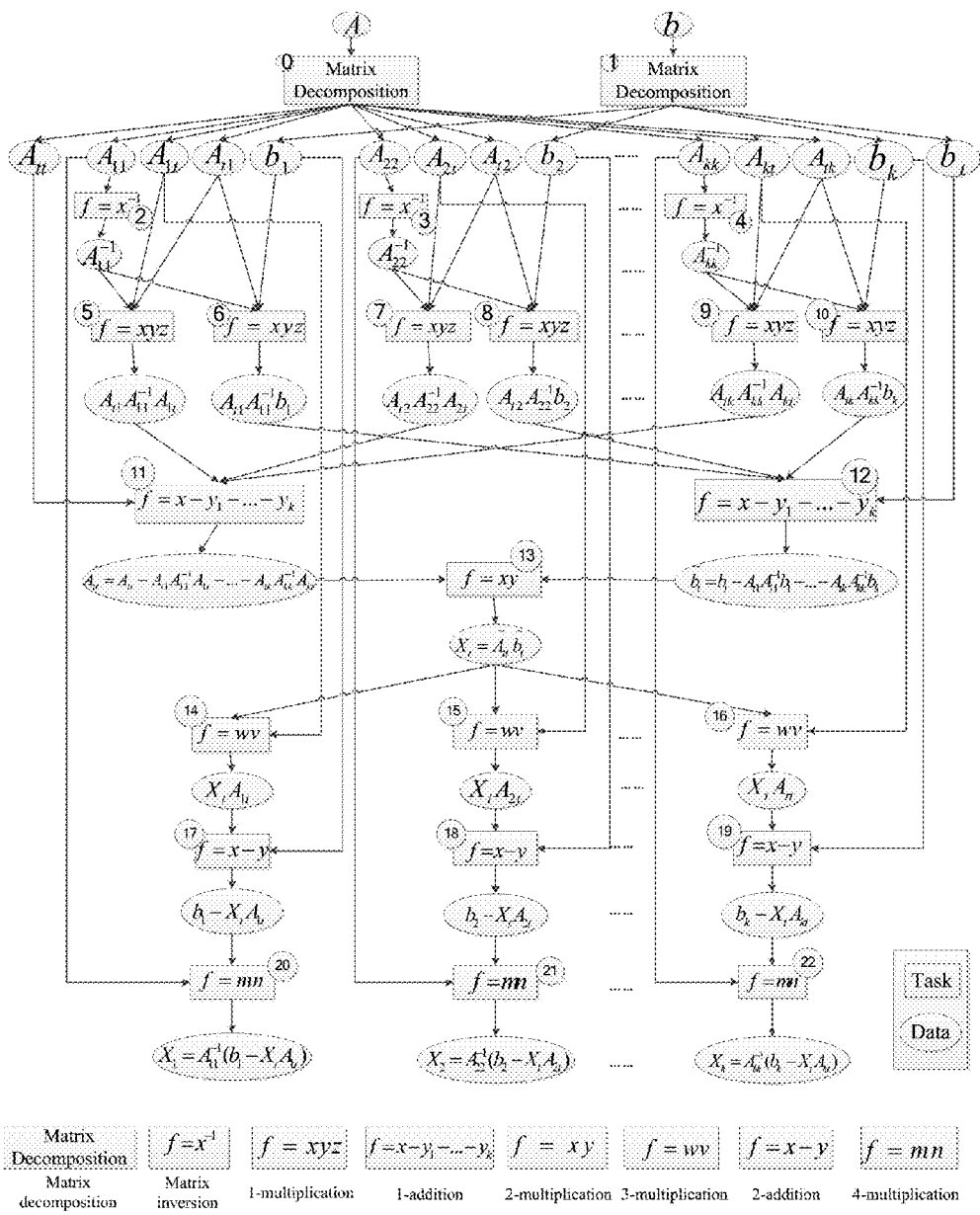
FIG. 3 shows a workflow diagram of the decomposition-coordination calculation based on BBDF model.

7. Packing the VM mentioned in step 3 into the data center servers, which is based on the constraints of total servers' energy consumption model of the data center servers mentioned in step 5;

8. Packing every task mentioned in step 2 into the corresponding VM which locates in a data center server, and then finishing the mapping from tasks to servers. As shown in FIG. 2, the indiscriminate placement method or the following binding method may be used:

(1) As shown in FIG. 3, according to the grid partition of BBDF model and the length of task commands, the tasks {3 for multiplication, 2 for addition and 4 for multiplication} after calculating the variable of coordination ($X_t$, the output of task 13 in FIG. 3) are bound to achieve the parallel calculating and reduce the calculating time.

(2) For tasks before the variable of coordination (X), place the tasks with input-output relationships in adjacent VMs, then the amount of the communication data and communication expense in data center networks can be reduced.

As shown in FIG. 3, the workflow diagram can be achieved by analyzing the calculating process of the decomposition-coordination calculation based on Block Bordered Diagonal Form (BBDF) model. In FIG. 3, the square represents a task which represents a distributed computing procedure; the ellipse represents communication data, as the input pointing to one task, or as the output results departing from the other task.

Taking IEEE 118 nodes standard electric power system as the computing example, the grid system can be partitioned into 3 sub-partitions, the amounts of nodes in each sub-partition are 35, 35 and 48. The amount of nodes in virtual border network is 7. The running time and total energy consumption of IT equipment in the data center may calculate as following:

(1) Calculating environment: the data center adopts Fat-tree structure, which includes 54 servers, 456-port switches. The configuration of each server is as follows: CPU is of Pentium4(2.8 GHz), memory is of 512 Mb, the servers' baseline energy consumption is of 145 W, the calculating energy consumption with each loaded VMs is of 10 W, the type of switch is HuaWei S3552F-EA 3-layer 6-port switch, operating power is of 54 W, and set the port speed of switches ranging between 0 and 8 Mb;

(2) Calculating the command length and the amount of communication data in each step based on the grid partition. The calculating formula of command length is: command length=(operation code length)+(operation code address)×(the amount of operation code address), the type of calculating data is floating-point type, then achieve table 1.

TABLE 1

Command length and communication data with IEEE 118 node system computing example

| Task | | Input (Kb) | Output (Kb) | Command length (bit) |
|---|---|---|---|---|
| Matrix decomposition | 0 | 54.8515 | 0.1914, 4.7851 0.957, 0.957 4.7851, 0.957 0.957, 9 1.3125, 1.3125 | 946832 |
| | 1 | 0.4609 | 0.1367, 0.1367 0.1875, 0.0273 | 8024 |
| Matrix inversion | 2 | 4.7851 | 4.7851 | 13189500 |
| | 3 | 4.7851 | 4.7851 | 13189500 |
| | 4 | 9 | 9 | 219591360 |
| 1-multiplication | 5 | 6.6992 | 0.1914 | 3164616 |
| | 6 | 5.8789 | 0.0273 | 3017920 |
| | 7 | 6.6992 | 0.1914 | 3164616 |
| | 8 | 5.8789 | 0.0273 | 3013920 |

TABLE 1-continued

Command length and communication data with IEEE 118 node system computing example

| Task | | Input (Kb) | Output (Kb) | Command length (bit) |
|---|---|---|---|---|
| | 9 | 11.625 | 0.1914 | 5705700 |
| | 10 | 10.5 | 0.0273 | 4149600 |
| 1-addition | 11 | 0.5742 | 0.1914 | 22932 |
| | 12 | 0.082 | 0.0273 | 3276 |
| 2-multiplication | 13 | 0.2187 | 0.0273 | 14196 |
| 3-multiplication | 14 | 0.9843 | 0.1367 | 70980 |
| | 15 | 0.9843 | 0.1367 | 70980 |
| | 16 | 1.4492 | 0.1875 | 97344 |
| 2-addition | 17 | 0.2734 | 0.1367 | 5460 |
| | 18 | 0.2734 | 0.1367 | 5460 |
| | 19 | 0.375 | 0.1875 | 7488 |
| 4-multiplication | 20 | 4.9218 | 0.1367 | 376740 |
| | 21 | 4.9218 | 0.1367 | 376740 |
| | 22 | 9.187 | 0.1875 | 711360 |

The total energy consumption of IT equipments in data center can be figured out based on the formula in step 4.

In the process of packing VMs into servers, best-fit algorithm and Descending order best-fit algorithm are applied, and the tasks are orderly packed into the VMs by using binding placement methods. Thus, four algorithms are compared: indiscriminate order placement with best-fit algorithm (IO-BF), indiscriminate order placement with descending order best-fit algorithm (IO-DOBF), binding placement with best-fit algorithm (BP-BF), and binding placement with descending order best-fit algorithm (BP-DOBF). The calculating time and energy consumption of four algorithms proposed in the invention are listed in the table below.

TABLE 2 calculating results of IEEE118 node system

| | IO-BF | IO-DOBF | BP-BF | BP-DOBF |
|---|---|---|---|---|
| Server time(s) | 0.1309 | 0.1265 | 0.0964 | 0.0963 |
| Switch time(s) | 0.0732 | 0.0559 | 0.0428 | 0.0479 |
| Total time(s) | 0.2041 | 0.1824 | 0.1392 | 0.1442 |
| Sever energy consumption(J) | 17.5148 | 16.904 | 15.9852 | 15.9706 |
| Switch energy consumption(J) | 8.9742 | 6.7151 | 5.0782 | 4.1649 |
| Total energy consumption(J) | 26.484 | 23.6191 | 21.0634 | 20.1355 |

What is claimed is:

1. A method for solving the decomposition-coordination calculation based on BBDF by using data center, which comprises the following steps:

(1) partitioning the electric power system network by using the existing network partitioning method to achieve the grid partition;

(2) setting each calculating step of the decomposition-coordination calculation based on BBDF as a task, and counting the total number of tasks of calculating process;

(3) acquiring the values of MIPS (Million Instructions Per Second) and memory in each PMs of data center, setting the number of VMs, and setting the values of MIPS and memory in each Virtual Machine (VM);

(4) calculating the total energy consumption of Information Technology (IT) equipments in data center by the following formula:

$$E_{total} = \sum_{i=1}^{N} E_{server} + \sum_{j=1}^{T} E_{switch} \quad (1)$$

wherein, $E_{server}$ represents the energy consumption of single server in the data center, $E_{switch}$ represents the energy consumption of single switch in the data center, N represents the number of servers in the data center, T represents the number of switches in the data center;

the energy consumption model of single server is expressed as follows:

$$E_{server} = P_{baseline} t_{max} + P_{VM} \sum_{k=1}^{M} t_k \quad (2)$$

wherein, Pbaseline represents the power consumption of the no-load running server, tmax represents the whole running time of servers, PVM represents the power consumption of a virtual machines in servers, tk represents the running time of the virtual machine k in servers, M represents the amount of virtual machines in servers;

the energy consumption model of single switch is expressed as follows:

$$E_{switch} = P_{switch} t_{max} \quad (3)$$

wherein, Pswitch represents the running power consumption of switches, tmax represents the whole running time of switches;

(5) using bin-packing model to describe the server energy consumption model, and achieving the minimum energy consumption model of servers;

the set of virtual machines is: $V=\{V_1, V_2, \ldots, V_Q | V_j = (R_j^{MIPS}, R_j^{MEM})\}$, wherein $R_j^{MIPS}$ and $R_j^{MEM}$ represent the values of MIPS and memory respectively for one virtual machine, the capacity value of single server is $C_i=(C_i^{MIPS}, C_i^{MEM})$, wherein $C_i^{MIPS}$ and $C_i^{MEM}$ represent the values of MIPS and memory respectively in a single server; the total servers' energy consumption model of the data center is expressed as follows:

$$\min \sum_{i=1} E_{server} H_i \quad (4)$$

the constraints of the total servers' energy consumption model are as follows:

$$\sum_{j=1}^{M} R_j^{MIPS} \cdot X_{j,i} \leq C_i^{MIPS}, \forall i \in \{1, 2, 3 \ldots\} \quad (5)$$

$$\sum_{j=1}^{M} R_j^{MEM} \cdot X_{j,i} \leq C_i^{MEM}, \forall i \in \{1, 2, 3 \ldots\} \quad (6)$$

$$X_{j,i} = 0 \text{ or } 1 \quad (7)$$

$$H_i = 0 \text{ or } 1 \quad (8)$$

wherein, $X_{j,i}=1$ represents the virtual machine j is packed in the server i, $X_{j,i}=0$ represents the virtual machine j is not in the server I; if the server i is used, $H_i=1$, otherwise, $H_i=0$;

(6) adopting best-fit algorithm or descending order best-fit algorithm to calculate the total energy consumption of data center servers;
(7) packing the VM mentioned in step (3) into the servers;
(8) packing every task mentioned in step (2) into the corresponding VM which locates in a data center server.

2. The method for solving the decomposition-coordination calculation based on BBDF by using data center according to claim 1, wherein, the packing process of step (7) is based on the constraints of total servers energy consumption model of the data center servers mentioned in step 5.

3. The method for solving the decomposition-coordination calculation based on BBDF by using data center according to claim 1, wherein, adopting indiscriminate order placement method or the following binding method to pack every task mentioned in step 2 into the corresponding virtual memory which locates in a data center server mentioned in step 8:
  (1) according to the grid partition of BBDF model and the command length of task, bind the tasks which represent every step of calculation after calculating the variable of coordination, thus the parallel calculating among different modules can be realized and the computing time can be shortened;
  (2) for tasks before calculating the variable of coordination, place the tasks with input-output relationships in adjacent VMs, then the amount of the communication data and communication expense by using data center networks can be reduced.

* * * * *